3,005,010
**METHOD FOR PREPARING DIHYDROCARBYL-
OXYPHOSPHINYL FORMAMIDES**
Daniel W. Grisley, Jr., Dayton, Ohio, assignor to Monsanto Chemical Company, St. Louis, Mo., a corporation of Delaware
No Drawing. Filed Aug. 10, 1959, Ser. No. 832,427
3 Claims. (Cl. 260—461)

This invention relates to organic phosphorus compounds containing nitrogen. In one respect, this invention relates to organic phosphorus compounds which contain a nitrogen atom linked to the carbon atom of a carbonyl group which is linked to the phosphorus atom of a phosphinyl group. In another respect, this invention relates to dihydrocarbyloxpyhosphinyl formamides wherein an amino nitrogen atom is linked directly to the carbonyl carbon atom of a phosphinyl formic acid group. In another respect, this invention relates to methods for preparing the dihydrocarbyloxyphosphinyl formamides, including the N-substituted dihydrocarbyloxyphosphinyl formamides.

Numerous organic compounds containing both phosphorus and nitrogen atoms are known to exist and to have considerable commercial value in a great variety of useful applications. However, the known organic phosphorus-nitrogen compounds have usually been characterized by the attachment of at least one nitrogen atom directly a phosphorus atom by a phosphorus-nitrogen bond. It is desirable to form other nitrogen-containing organic phosphorus compounds having other functional groups incorporated therein since such compounds would probably have new uses and applications.

I have discovered that the S-alkyl-dihydrocarbyloxyphosphinyl thioformates can be reacted with ammonia or primary or secondary amines to form a dihydrocarbyloxyphosphinyl formamide having a phosphinyl phosphorus atom separated from a nitrogen atom by a carbonyl group.

An object of this invention is to provide organic phosphorus compounds wherein the phosphinyl phosphorus atom is linked directly to a carbonyl carbon atom which is linked directly to an amino nitrogen atom.

Another object of this invention is to provide methods for producing dihydrocarbyloxyphosphinyl formamides and N-substituted derivatives thereof from the S-alkyl-dihydrocarbyloxyphosphinyl thioformates.

Other aspects, objects and advantages of this invention are apparent from a consideration of the accompanying disclosure and the appended claims.

According to the present invention, S-alkyl-dihydrocarbyloxyphosphinyl thioformates are reacted with ammonia or a primary or a secondary amine to form a dihydrocarbyloxyphosphinyl formamide according to the reaction which proceeds as follows:

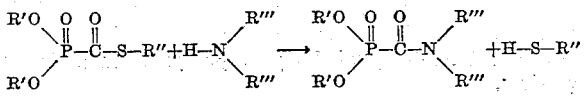

wherein R' is a hydrocarbyl radical containing from 1 to 12 carbon atoms selected from the group consisting of alkyl, aryl, alkaryl, and aralkyl radicals, R" is an alkyl radical of from 1 to 8 carbon atoms, and R'" and R"" are the same or different radicals selected from the group consisting of hydrogen, alkyl, aryl, alkaryl, aralkyl and alkenyl radicals of less than 12 carbon atoms. The expression "hydrocarbyl" as used herein and in the appended claims refers to the radical obtained by the removal of a hydrogen atom from any hydrocarbon.

The S-alkyl-dihydrocarbyloxyphosphinyl thioformate reactants employed in the reaction of this invention can be produced by any methods known to those skilled in the art and preferably are produced by the method disclosed and claimed in application Serial No. 832,424, filed August 10, 1959 wherein alkali metal dihydrocarbyloxyphosphinyl thioformates are reacted with alkyl sulfates. The alkyl radical in the S-alkyl-dihydrocarbyloxyphosphinyl thioformate reactant preferably contains from 1 to 8 carbon atoms, and can include radicals such as methyl, ethyl, propyl, n-butyl, isobutyl, n-hexyl, and the like. The hydrocarbyl radicals in these reactants are substantially free of acetylenic unsaturation and contain from 1 to 12 carbon atoms. Suitable hydrocarbyl radicals include the alkyl, aryl, alkaryl and aralkyl radicals. Illustrative examples of suitable thioformate reactants include S-methyl-diethoxyphosphinyl thioformate, S-ethyl-diethoxyphosphinyl thioformate, S-methyl-dimethoxyphosphinyl thioformate, S-propyl-dibutoxyphosphinyl thioformate, S-methyl-diphenoxyphosphinyl thioformate, S-methyl-dibenzyloxyphosphinyl thioformate, and the like.

The primary or secondary amine reactants employed in the reaction of this invention can be substituted with alkyl, aryl, alkaryl, aralkyl or alkenyl radicals containing less than 12 carbon atoms. Illustrative examples of suitable primary amines include methyl amine, ethyl amine, n-butyl amine, isobutyl amine, sec-butyl amine, tert-butyl amine, n-hexyl amine, allyl amine, 5-aminopentane, aniline, 2-biphenyl amine, γ and β naphthyl amine, o-, m-, and p-methylaniline, 2,3-, 3,4-, 2,6-, 2,4-, 3,5-, and 2,5-dimethylaniline, p-isopropylaniline, 2,4,5-trimethylaniline, benzyl amine, and β-phenylethyl amine. Illustrative examples of suitable secondary amines include the following: trimethyl amine, diethylamine, di-n-butyl amine, di-isobutyl amine, methylethyl amine, ethylbutyl amine, propylhexyl amine, diphenyl amine, N-phenyl-1-naphthyl amine, N-phenyl-2-naphthyl amine, N-methyl aniline, and N-ethyl aniline.

The reaction of this invention takes place by merely mixing the S-alkyl-dihydrocarbyloxyphosphinyl thioformate with either the ammonia or the amine without the necessity for using elevated temperatures, elevated pressures or catalysts. Thus, the reaction can be conducted very readily at room temperature and at atmospheric pressure; however, the use of somewhat elevated temperatures may be desirable in order to decrease the reaction time. In general, a temperature within the range of from 0 to 100° C. will be employed. The use of temperatures above about 100° C. results in substantial by-products being formed; however, side reactions can be reduced by using elevated pressures. It is also desirable to use elevated pressures when using the ammonia reagent; however, the pressures used will normally be less than 200 p.s.i.g. Usually, stoichiometric proportions of the two reactants are used but an excess of either reactant can be employed if desired. Although it is not necessary to conduct the reaction in an inert diluent or solvent medium, it is usually desirable to employ a solvent in which the thioformate is soluble, such as tetrahydrofuran, when gaseous ammonia is used as a reactant. It is not necessary that the thioformate be soluble in the solvent, as it may be suspended therein, and other solvents such as benzene, toluene, diethyl ether, dioxane, hexane, diethylcarbitol and the like can be used.

Illustrative examples of the dihydrocarbyloxyphosphinyl formamides produced in the process of this invention using ammonia as a reactant include dimethoxyphosphinyl formamide, diethoxyphosphinyl formamide, diphenoxyphosphinyl formamide and dibenzyloxyphosphinyl formamide.

Illustrative examples of the N-substituted dihydrocarbyloxyphosphinyl formamides produced by the process of this invention using primary or secondary amine reactants include the following: N-methyl-diethoxyphosphinyl formamide, N-isobutyldiphenoxyphosphinyl formamide, N-allyl-dibutoxyphosphinyl formamide, N-phenyl-diethoxyphosphinyl formamide, N-benzyl-dimethoxyphosphinyl formide N,N-dimethyl-diethoxyphosphinyl formamide, N,N-diisobutyl-dimethoxyphosphinyl formamide, N,N-diallyl-diethoxyphosphinyl formamide, N-methyl-N-ethyl-diphenoxyphosphinyl formamide, N-phenyl-N-methyl-diethoxyphosphinyl formamide, N,N-diphenyl-dimethoxyphosphinyl formamide, and N-allyl-N-propyl-dibutoxyphosphinyl formamide.

The dihydrocarbyloxyphosphinyl formamide products of this invention range from clear liquids to crystalline solids which are relatively stable at room temperature. These compounds may be advantageously employed as plasticizing agents for various synthetic resins, particularly polyvinyl resins. They may also be used in the textile industry as surface active agents, softening agents, textile lubricants and the like. These compounds are also useful as additives in high pressure lubricants to impart extreme pressure resisting properties to the lubricants. These compounds also exhibit some herbicidal activity when applied to the foliage of plants. For example, N,N-diallyl-diethoxyphosphinyl formamide had moderate effect on bean and broad leaf plants when applied at a concentration of 0.50% and diethoxyphosphinyl formamide had slight effect on grass and broad leaf plants but no effect on bean plants when applied in the same concentration. The diethoxyphosphinyl formamide is also useful as an agricultural fungicide in controlling *Puccinia rubigo-b. tritici* when applied in concentrations of 0.25% and 0.10%.

The advantages, desirability and usefulness of the new compounds of this invention are illustrated by the following examples:

*Example 1*

Diethoxyphosphinyl formamide was prepared by reacting 4.2 g. (0.02 mole) of S-methyl-diethoxyphosphinyl thioformate dissolved in 30 ml. of tetrahydrofuran with gaseous ammonia. The thioformate solution was placed in a 3-neck glass flask provided with a gas inlet tube and ammonia gas was introduced into the solution, with mechanical stirring, for a period of 3 hours at room temperature. The white crystals which formed were filtered, washed with diethyl ether, and dried at 70° C. under 20 mm. pressure to yield 2.80 g. of diethoxyphosphinyl formamide. A sample of the product was recrystallized from hot ethyl acetate and dried at room temperature under 20 mm. pressure for 24 hours to yield a product having a melting point of 138–139° C. Chemical analysis of the product was as follows:

|  | Found | Calculated for $C_5H_{12}NO_4P$ |
| --- | --- | --- |
| Percent Carbon | 33.03 | 33.16 |
| Percent Hydrogen | 6.73 | 6.68 |
| Percent Nitrogen | 7.84 | 7.74 |
| Percent Phosphorus | 17.19 | 17.10 |

The infrared spectrum of the product had a peak at 3.0 microns, corresponding to the nitrogen-hydrogen bond, and at 5.9 microns, corresponding to the carbonyl group.

*Example 2*

In this example, N,N-diallyl-diethoxyphosphinyl formamide was produced by reacting 10.6 g. (0.05 mole) of S-methyl-diethoxy-phosphinyl thioformate with 10 g. (0.1 mole) of diallylamine. The reaction was conducted in a flask protected from the atmosphere by a drying tube and an inert solvent was used. The reaction mixture was stirred at room temperature for one week and excess diallylamine was thereafter removed from the reaction mixture by evaporation at 100° C. under a pressure 20 mm. for 20 minutes. The residual liquid was then distilled to yield 11.3 g. of N,N-diallyl-diethoxyphosphinyl formamide having a boiling point of 106–108° C. at a pressure of 0.2 mm. Chemical analysis of the product was as follows:

|  | Found | Calculated for $C_{11}H_{20}NO_4P$ |
| --- | --- | --- |
| Percent Carbon | 50.01 | 50.55 |
| Percent Hydrogen | 7.90 | 7.72 |
| Percent Nitrogen | 6.47 | 5.36 |
| Percent Phosphorus | 11.42 | 11.85 |

Reasonable variation and modification of the invention as described are possible, the essence of which is that there have been provided methods for preparing dihydrocarbyloxyphosphinyl formamides, including N-substituted derivatives thereof, by reacting an S-alkyl-dihydrocarbyloxyphosphonyl thioformate with either ammonia or a primary or a secondary amine.

I claim:

1. The method which comprises reacting a S-alkyl-dihydrocarbyloxyphosphinyl thioformate of the formula

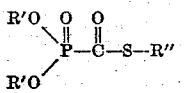

wherein R′ is a hydrocarbyl radical substantially free of aliphatic unsaturation containing from 1 to 12 carbon atoms selected from the group consisting of alkyl, aryl, alkaryl, and aralkyl radicals and R″ is an alkyl radical of from 1 to 8 carbon atoms with a compound of the formula

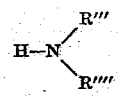

wherein R‴ and R⁗ are each selected from the group consisting of hydrogen, alkyl, aryl, alkaryl, aralkyl, and alkenyl radicals of less than 12 carbon atoms and recovering from the reaction mixture an organic phosphorus compound of the formula

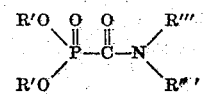

wherein R′, R‴, and R⁗ are as above identified.

2. The method which comprises reacting S-methyl-diethoxyphosphinyl thioformate with ammonia and recovering diethoxyphosphinyl formamide as product.

3. The method which comprises reacting S-methyl-diethoxyphosphinyl thioformate with diallylamine and recovering N,N-diallyl-diethoxyphosphinyl formamide as product.

No references cited.

UNITED STATES PATENT OFFICE
CERTIFICATION OF CORRECTION

Patent No. 3,005,010                          October 17, 1961

Daniel W. Grisley, Jr.

It is hereby certified that error appears in the above numbered patent requiring correction and that the said Letters Patent should read as corrected below.

Column 1, lines 55 to 59, the formula should appear as shown below instead of as in the patent:

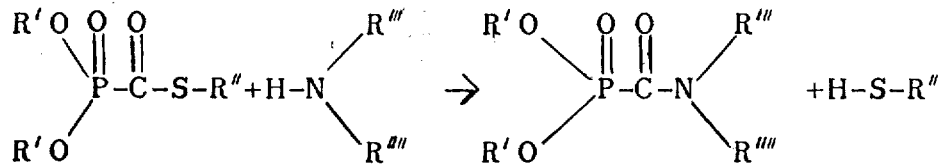

column 4, line 50 to 54, the formula should appear as shown below instead of as in the patent:

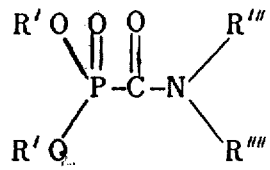

Signed and sealed this 8th day of May 1962.

(SEAL)
Attest:

ERNEST W. SWIDER
Attesting Officer

DAVID L. LADD
Commissioner of Patents